United States Patent
Muramatsu et al.

(10) Patent No.: US 9,312,527 B2
(45) Date of Patent: Apr. 12, 2016

(54) SEPARATOR HAVING HEAT RESISTANT INSULATION LAYERS

(75) Inventors: Hironobu Muramatsu, Tokyo (JP); Tamaki Hirai, Yokohama (JP); Kazuki Miyatake, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 88 days.

(21) Appl. No.: 14/127,741

(22) PCT Filed: Jun. 13, 2012

(86) PCT No.: PCT/JP2012/065100
§ 371 (c)(1),
(2), (4) Date: Dec. 19, 2013

(87) PCT Pub. No.: WO2012/176669
PCT Pub. Date: Dec. 27, 2012

(65) Prior Publication Data
US 2014/0113176 A1    Apr. 24, 2014

(30) Foreign Application Priority Data

Jun. 22, 2011    (JP) .................................. 2011-138983

(51) Int. Cl.
*H01M 2/16*    (2006.01)
*H01M 10/052*    (2010.01)
*H01M 10/42*    (2006.01)

(52) U.S. Cl.
CPC .............. *H01M 2/1646* (2013.01); *H01M 2/16* (2013.01); *H01M 2/1653* (2013.01); *H01M 2/1686* (2013.01); *H01M 10/4235* (2013.01); *H01M 10/052* (2013.01); *Y02T 10/7011* (2013.01)

(58) Field of Classification Search
CPC ... H01M 2/1646; H01M 2/16; H01M 2/1686; H01M 2/1653; H01M 10/4235; H01M 10/052; Y02T 10/7011
See application file for complete search history.

(56) References Cited

U.S. PATENT DOCUMENTS 7,883,799 B2    2/2011    Seo et al.
8,298,465 B2    10/2012   Kikuchi et al.
(Continued)

FOREIGN PATENT DOCUMENTS

CN    101728577 A    6/2010
JP    H10-275634    * 10/1998    .............. H01M 2/16
(Continued)

OTHER PUBLICATIONS

European Extended Search Report, Dec. 2, 2014, 7 pages.
(Continued)

*Primary Examiner* — Patrick Ryan
*Assistant Examiner* — Aaron Greso
(74) *Attorney, Agent, or Firm* — Foley & Lardner LLP

(57) ABSTRACT

A separator (1) having heat resistant insulation layers for an electric device includes a resin porous substrate (2), and heat resistant insulation layers (3) formed on both surfaces of the resin porous substrate (2) and containing heat resistant particles having a melting point or a thermal softening point of 150° C. or higher. A parameter X represented by the following mathematical formula 1 is greater than or equal to 0.15:

$$X = \frac{(A' + A'')}{C \times (A'/A'')^2} \qquad \text{[Math 1]}$$

where A' and A" represent thicknesses (μm) of the respective heat resistant insulation layers (3) formed on both surfaces of the resin porous substrate (2) while fulfilling a condition of A'≥A", and C represents the entire thickness (μm) of the separator (1) having heat resistant insulation layers.

8 Claims, 4 Drawing Sheets

(56) References Cited

U.S. PATENT DOCUMENTS

| | | |
|---|---|---|
| 8,318,360 B2 | 11/2012 | Seo et al. |
| 8,405,957 B2 | 3/2013 | Katayama et al. |
| 8,815,435 B2 | 8/2014 | Nishikawa |
| 2007/0264577 A1 | 11/2007 | Katayama et al. |
| 2007/0281206 A1* | 12/2007 | Fujikawa et al. ............... 429/62 |
| 2010/0099018 A1 | 4/2010 | Kawase et al. |
| 2010/0316903 A1 | 12/2010 | Kim et al. |
| 2011/0033743 A1 | 2/2011 | Lee et al. |
| 2011/0064988 A1 | 3/2011 | Yu |
| 2011/0166243 A1 | 7/2011 | Kikuchi et al. |

FOREIGN PATENT DOCUMENTS

| | | |
|---|---|---|
| JP | 2004-022208 A | 1/2004 |
| JP | 2007-324073 A | 12/2007 |
| JP | 2010-092882 A | 12/2007 |
| JP | 2009-517810 A | 4/2009 |
| JP | 2010-092718 A | 4/2010 |
| JP | 2010-146839 A | 7/2010 |
| JP | 2011-505663 A | 2/2011 |
| JP | 2011-516684 A | 5/2011 |
| JP | 2011-108444 A | 6/2011 |
| TW | 200732155 | 9/2007 |
| TW | 201009001 A1 | 3/2010 |
| WO | WO2007/066768 A1 | 6/2007 |
| WO | WO 2011/019187 A2 | 2/2011 |

OTHER PUBLICATIONS

Taiwanese Office Action, Feb. 21, 2014, 5 pages.

\* cited by examiner

SEPARATOR HAVING HEAT RESISTANT INSULATION LAYERS

TECHNICAL FIELD

The present invention relates to a separator having heat resistant insulation layers.

BACKGROUND ART

There has been a strong demand for reduction of carbon dioxide in order to deal with atmospheric pollution and global warming. In the automobile industry, the reduction of emissions of carbon dioxide is highly expected in association with the spread of electric vehicles (EV) and hybrid electric vehicles (HEV). Thus, development of electric devices such as secondary batteries for driving motors as a key to practical application of such vehicles, is actively being carried out.

In particular, lithium ion secondary batteries are preferably used for electric vehicles because of high energy density and durability of repeated charge and discharge and therefore, the batteries tend to have larger capacities. As a result, the lithium ion secondary batteries are further required to ensure safety.

Lithium ion secondary batteries generally include positive electrodes each containing a positive electrode active material applied to both surfaces of a positive electrode current collector and negative electrodes each containing a negative electrode active material applied to both surfaces of a negative electrode current collector. Each positive electrode and each negative electrode are connected to each other via an electrolyte layer including a separator holding an electrolysis solution or electrolyte gel. Plural sets of the positive electrode, the negative electrode and the separator are housed in a battery casing.

For example, a polyolefin microporous film having a thickness approximately in the range from 20 μm to 30 μm is widely used as a separator. However, such a polyolefin microporous film has a risk of thermal contraction because of an increase in temperature inside the battery and a short circuit in association with the thermal contraction.

In order to suppress the thermal contraction, advances in the development of separators having heat resistant insulation layers are being made, in which heat resistant porous layers are stacked on surfaces of a microporous film. For example, Patent Literature 1 teaches that such a separator is used for a wound type lithium ion battery so as to suppress thermal contraction caused by an increase in temperature inside the battery.

CITATION LIST

Patent Literature

Patent Literature 1: International Publication WO 2007/066768

SUMMARY OF INVENTION

However, if the separator described in Patent Literature 1 is used for a flat laminated type non-aqueous electrolyte secondary battery, an edge portion of the separator may curl during the manufacture of the battery, and the separator with the edge portion folded is stacked and laminated. In particular, in the case of a large-size battery used for an electric vehicle, since each member has a large area, even slight distortion may cause a defect in the battery during the operation, which leads to a great decrease of yield rate.

The present invention has been accomplished in view of the conventional problem. An object of the present invention is to provide a separator having heat resistant insulation layers capable of preventing a curl so as to stably manufacture an electric device with high reliability.

A separator having heat resistant insulation layers according to an aspect of the present invention, includes a resin porous substrate, and heat resistant insulation layers formed on both surfaces of the resin porous substrate and containing heat resistant particles having a melting point or a thermal softening point of 150° C. or higher. A parameter X represented by the following mathematical formula 1 is greater than or equal to 0.15.

$$X = \frac{(A' + A'')}{C \times (A'/A'')^2} \quad \text{[Math 1]}$$

In the formula, A' and A" represent thicknesses (μm) of the respective heat resistant insulation layers formed on both surfaces of the resin porous substrate while fulfilling a condition of A'≥A", and C represents the entire thickness (μm) of the separator having heat resistant insulation layers.

DESCRIPTION OF EMBODIMENTS

A separator having heat resistant insulation layers for an electric device according to the present invention and an electric device using such a separator will be explained in detail below with reference to the drawings. It should be noted that the same elements in the following explanations of the drawings are indicated by the same reference numerals, and overlapping explanations thereof are not repeated. In addition, dimensional ratios in the drawings are magnified for convenience of explanation and may be different from actual ratios.

The separator having heat resistant insulation layers for an electric device according to an embodiment of the present invention and the electric device using such a separator do not easily cause a defect at the point of stacking each element even when the electric device is a large-size flat laminated type electric device. This improves productivity. Therefore, the electric device using the separator having heat resistant insulation layers according to the present embodiment, in particular, a non-aqueous electrolyte secondary battery is preferably used for a driving power source or an auxiliary power source of a vehicle.

The electric device according to the present embodiment is not particularly limited with regard to constituent elements as long as the separator having heat resistant insulation layers explained below is used. In the present embodiment, a lithium ion battery is explained as an example of the electric device.

As a usage example of the lithium ion battery, either a lithium ion primary battery or a lithium ion secondary battery is possible. Because the separator has high cycle durability, it is preferably used as a lithium ion secondary battery for use in a driving power source of a vehicle or a mobile device such as a mobile phone.

The separator having heat resistant insulation layers may be used for a flat laminated type (flat shaped) battery. The structure of the flat laminated type battery contributes to ensuring long-term reliability due to an easy sealing technique such as thermal adhesion and has an advantage in cost and operation efficiency.

In terms of electrical connection (the electrode structure) inside the lithium ion battery, the present embodiment is applicable not only to a non-bipolar battery (internal parallel connection-type) but also to a bipolar battery (internal serial connection-type).

The separator having heat resistant insulation layers may be used for a solution electrolyte type battery using a solution electrolyte such as a non-aqueous electrolysis solution. The separator may also be used for an electrolyte layer used in, for example, a gel electrolyte battery using a polymer gel electrolyte.

Hereinafter, a non-bipolar lithium ion secondary battery using the separator having heat resistant insulation layers according to the present embodiment is explained with reference to the drawings.

[Entire Structure of Battery]

Figure 1:
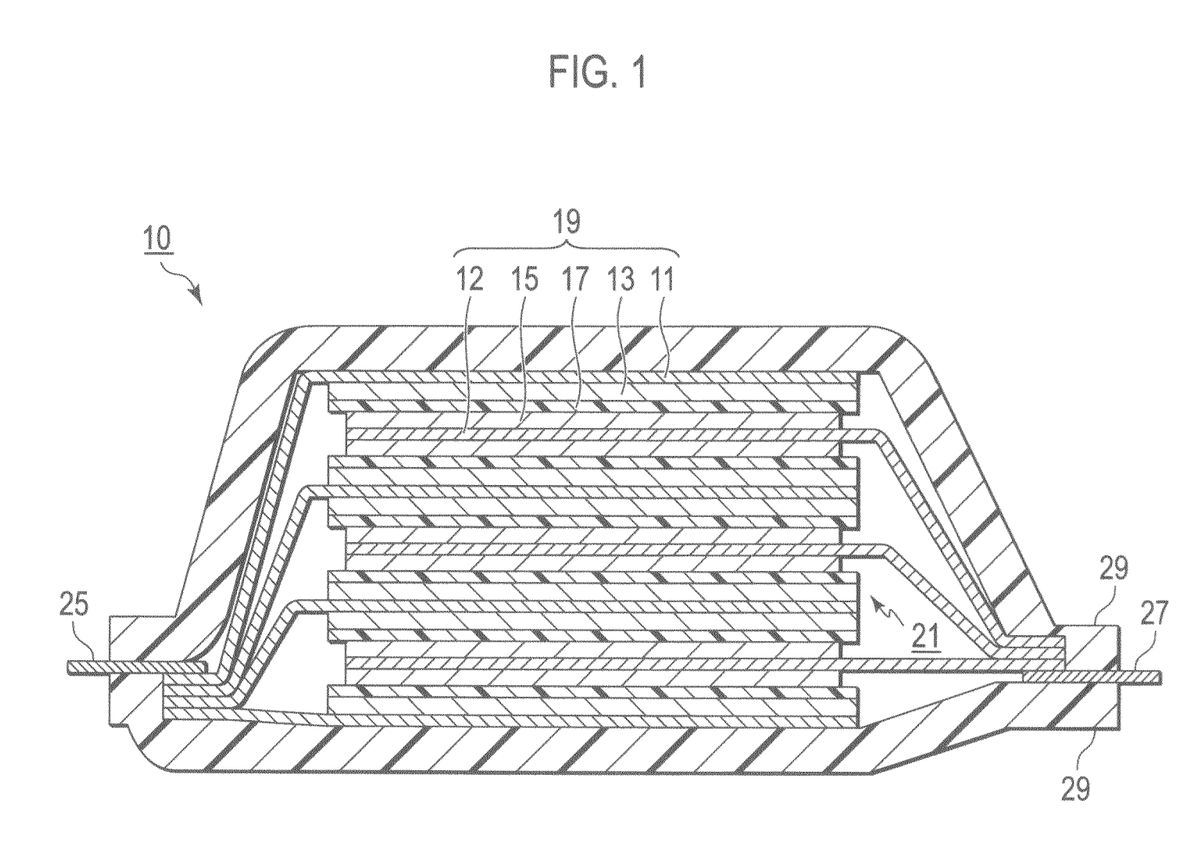
FIG. 1 is a cross-sectional view showing a typical flat laminated type non-bipolar lithium ion secondary battery according to an embodiment of the present invention.

FIG. 1 shows the entire structure of a flat laminated type (flat shaped) lithium ion secondary battery according to an embodiment of the present invention. Hereinafter, the flat laminated type lithium ion secondary battery may be simply referred to as a "laminated battery".

As shown in FIG. 1, a laminated battery 10 according to the present embodiment has a configuration in which a substantially rectangular power generation element 21, in which a charge-discharge reaction actually progresses, is sealed inside a battery exterior member 29. The power generation element 21 has a configuration in which positive electrodes, electrolyte layers and negative electrodes are stacked. Each positive electrode has a configuration in which positive electrode active material layers 13 are provided on both surfaces of a positive electrode current collector 11. Each electrolyte layer 17 has a configuration in which an electrolyte (an electrolysis solution or electrolyte gel) is held in a separator. Each negative electrode has a configuration in which negative electrode active material layers 15 are provided on both surfaces of a negative electrode current collector 12. In other words, several sets of the positive electrode, the electrolyte layer and the negative electrode arranged in this order are stacked on top of each other in a manner such that one positive electrode active material layer 13 faces one negative electrode active material layer 15 with the electrolyte layer 17 interposed therebetween.

The positive electrode, the electrolyte layer, and the negative electrode which are adjacent to one another thus constitute a single cell layer 19. Namely, the laminated battery 10 shown in FIG. 1 has a constitution in which the plural single cell layers 19 are stacked on top of each other so as to be electrically connected in parallel. Here, the positive electrode current collectors located on the outermost layers of the power generation element 21 are each provided with the positive electrode active material layer 13 only on one side thereof. Alternatively, the positive electrode current collectors may be provided with the positive electrode active material layers 13 on both sides thereof. Namely, the current collector provided with the positive electrode active material layers on both sides thereof may be used as the current collector at the outermost layer, in addition to the case where the current collector at the outermost layer is the current collector in which the active material layer is provided only on one side thereof. Similarly, the negative electrode current collectors each provided with the negative electrode active material layer on one side or both sides thereof, may be located on the outermost layers of the power generation element 21 in a manner such that the positions of the positive electrode and the negative electrode shown in FIG. 1 are reversed.

A positive electrode current collecting plate 25 and a negative electrode current collecting plate 27 which are electrically conductive to the respective electrodes (the positive electrode and the negative electrode) are attached to the positive electrode current collector 11 and the negative electrode current collector 12 respectively. The positive electrode current collecting plate 25 and the negative electrode current collecting plate 27 are held by each end portion of the battery exterior member 29 and exposed to the outside of the battery exterior member 29. The positive electrode current collecting plate 25 and the negative electrode current collecting plate 27 may be attached to the positive electrode current collector 11 and the negative electrode current collector 12 of the respective electrodes via a positive electrode lead and a negative electrode lead (not shown in the figure) by, for example, ultrasonic welding or resistance welding.

The lithium ion secondary battery described above is characterized by the separator. Hereinafter, main constituent members of the battery including the separator are described.

[Active Material Layer]

The positive electrode active material layer 13 and the negative electrode active material layer 15 each contain an active material and other additives as necessary.

The positive electrode active material layer 13 contains a positive electrode active material. Examples of the positive electrode active material include a lithium-transition metal composite oxide such as $LiMn_2O_4$, $LiCoO_2$, $LiNiO_2$, $Li(Ni—Co—Mn)O_2$, and an oxide in which part of each of these transition metals is substituted with other elements; a lithium-transition metal phosphate compound; and a lithium-transition metal sulfate compound. Two or more kinds of these positive electrode active materials may be used together according to circumstances. In view of the capacity and output performance, the lithium-transition metal composite oxide is preferably used as the positive electrode active material. Positive electrode active materials other than those described above may also be used.

The negative electrode active material layer 15 contains a negative electrode active material. Examples of the negative electrode active material include a carbon material such as graphite, soft carbon, and hard carbon; a lithium-transition metal composite oxide (such as $Li_4Ti_5O_2$); a metal material; and a lithium alloy series negative electrode material. Two or more kinds of these negative electrode active materials may be used together according to circumstances. In view of the capacity and output performance, the carbon material or the lithium-transition metal composite oxide is preferably used as the negative electrode active material. Negative electrode active materials other than those described above may also be used.

An average particle diameter of the respective active materials contained in the positive electrode active material layer 13 and the negative electrode active material layer 15 is not particularly limited; however, it is preferably in the range from 1 μm to 100 μm, more preferably 1 μm to 20 μm, in view of higher output performance.

The positive electrode active material layer 13 and the negative electrode active material layer 15 each preferably contain a binder. The binder used in the positive electrode active material layer 13 and the negative electrode active material layer 15 is not particularly limited. Examples of the binder include a thermoplastic polymer such as polyethylene, polypropylene, polyethylene terephthalate (PET), polyethernitrile, polyacrylonitrile, polyimide, polyamide, cellulose, carboxymethylcellulose (CMC), an ethylene-vinyl acetate copolymer, polyvinyl chloride, styrene butadiene rubber (SBR), isoprene rubber, butadiene rubber, ethylene propylene rubber, an ethylene propylene diene copolymer, a styrene-butadiene-styrene block copolymer and a hydrogen additive thereof, and a styrene-isoprene-styrene block copolymer and a hydrogen additive thereof. The binder may also be fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF). Other examples of the binder include vinylidene fluoride fluoro rubber such as vinylidene fluoride-hexafluoropropylene fluoro rubber (VDF-HFP fluoro rubber), vinylidene fluoride-hexafluoropropylene-tetrafluoroethylene fluoro rubber (VDF-HFP-TFE fluoro rubber), vinylidene fluoride-pentafluoropropylene fluoro rubber (VDF-PFP fluoro rubber), vinylidene fluoride-pentafluoropropylene-tetrafluoroethylene fluoro rubber (VDF-PFP-TFE fluoro rubber), vinylidene fluoride-perfluoromethyl vinyl ether-tetrafluoroethylene fluoro rubber (VDF-PFMVE-TFE fluoro rubber), and vinylidene fluoride-chlorotrifluoroethylene fluoro rubber (VDF-CTFE fluoro rubber). Still another example of the binder is epoxy resin. Among these, polyvinylidene fluoride, polyimide, styrene-butadiene rubber, carboxymethyl cellulose, polypropylene, polytetrafluoroethylene, polyacrylonitrile, and polyamide, are particularly preferable. These binders are suitable for use in the active material layers since these binders have high heat resistance, have quite a wide potential window, and are stable with respect to both positive electrode potential and negative electrode potential. The binders may be used alone or in combination of two or more.

The amount of the binder contained in the respective active material layers is not particularly limited as long as it is sufficient to bind the active material. However, the amount of the binder is preferably in the range from 0.5% to 15% by mass, more preferably in the range from 1% to 10% by mass, with respect to each active material layer.

Examples of other additives contained in the respective active material layers include an electric conducting additive, electrolyte salt (lithium salt), and an ion-conducting polymer.

The electric conducting additive is an additive added in order to improve electric conductivity in the positive electrode active material layer or the negative electrode active material layer. The electric conducting additive may be a carbon material such as carbon black (such as acetylene black), graphite, and carbon fiber. The addition of the electric conducting additive in the active material layers contributes to effectively establishing an electronic network in the active material layers and improving the output performance of the battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion-conducting polymer include a polyethylene oxide (PEO)-based polymer and a polypropylene oxide (PPO)-based polymer.

A mixing ratio of the components contained in each of the positive electrode active material layer and the negative electrode active material layer is not particularly limited. The mixing ratio may be adjusted by appropriately referring to the known findings on non-aqueous secondary batteries. The thickness of the respective active material layers is not particularly limited, and the known findings on batteries may be appropriately referred to. As an example, the thickness of the respective active material layers may be approximately in the range from 2 μm to 100 μm.

[Current Collector]

The positive electrode current collector 11 and the negative electrode current collector 12 are each made from an electrically conductive material. The size of the current collectors may be determined depending on the intended use of the battery. For example, current collectors having large areas are used for a large-size battery for which high energy density is required. The lithium ion battery according to the present embodiment is preferably a large-size battery, and the current collectors used therein have, for example, a long side of 100 mm or greater, preferably have a size of 100 mm×100 mm, more preferably 200 mm×200 mm. The thickness of the current collectors is not particularly limited; however, the thickness is approximately in the range from 1 μm to 100 μm. The shape of the current collectors is not particularly limited. The laminated battery 10 shown in FIG. 1 may use current collecting foils or mesh current collectors (such as expanded grids).

The material contained in the respective current collectors is not particularly limited; however, metal is preferably used. Examples of the metal include aluminum, nickel, iron, stainless steel, titanium, and copper. In addition, a clad metal of nickel and aluminum, a clad metal of copper and aluminum, or an alloyed material of these metals combined together, is preferably used. A foil in which the metal surface is covered with aluminum may also be used. In particular, aluminum, stainless steel, and copper are preferable in view of electron conductivity and battery action potential.

[Electrolyte Layer]

The electrolyte layer 17 has a constitution in which an electrolyte is held in the central portion in the plane direction of the separator according to the present embodiment. The use of the separator according to the present embodiment can prevent edge portions of the separator from curling at the time of stacking, thereby stably manufacturing a battery with high reliability.

(Separator Having Heat Resistant Insulation Layers)

The separator having heat resistant insulation layers according to the present embodiment includes a resin porous substrate, and heat resistant insulation layers formed on both surfaces of the resin porous substrate and including heat resistant particles having a melting point or a thermal softening point of 150° C. or higher. The separator is characterized in that a parameter X represented by the following mathematical formula (1) is greater than or equal to 0.15.

[Math 2]

$$X = \frac{(A' + A'')}{C \times (A'/A'')^2} \quad (1)$$

In the formula, A' and A" represent thicknesses (μm) of the heat resistant insulation layers formed on both surfaces of the resin porous substrate while fulfilling the condition of A'≥A", and C represents the entire thickness (μm) of the separator having heat resistant insulation layers.

The separator according to the present embodiment can prevent edge portions from bending or curling. Therefore, the separator according to the present embodiment contributes to improving yield rate in the process of manufacturing flat laminated type batteries. If the parameter X is below 0.15, the likelihood of a curl cannot be ignored. As a result, yield rate significantly decreases particularly when large-size flat laminated type batteries are manufactured.

Figure 2:
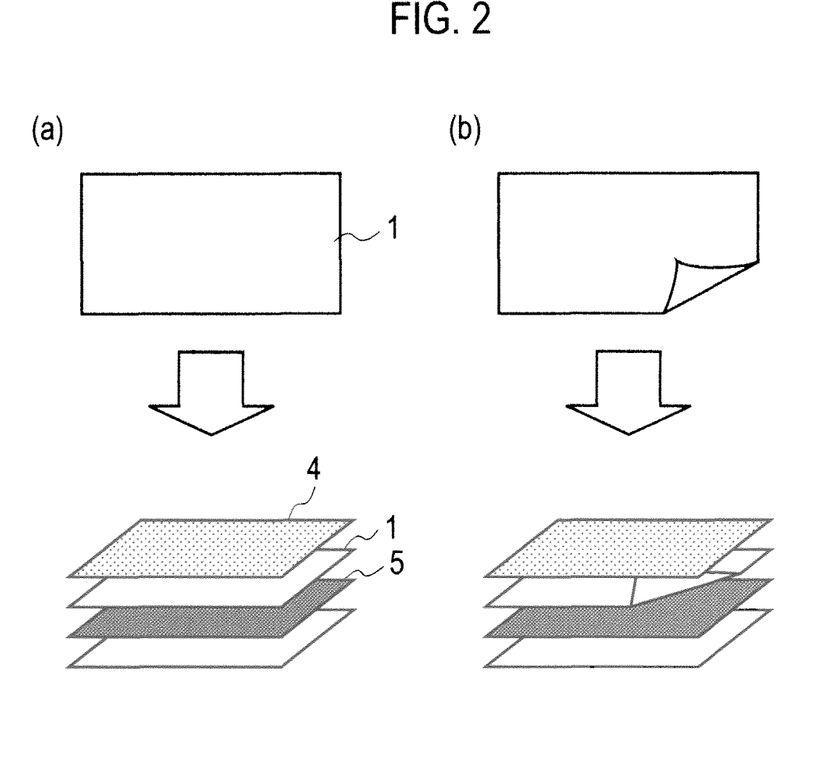
FIG. 2 is a schematic view showing a separator having heat resistant insulation layers according to an embodiment of the present invention.

In the separator described in Patent Literature 1, a defect at the time of stacking because of a curl of the separator is not easily caused when the separator is used for a wound type battery. However, when the separator is used for a large-size flat laminated type battery such as a lithium ion secondary battery for an electric vehicle, even slight distortion may cause a defect during the stacking operation since each member has a large area. For example, as shown in FIG. 2(a), when a large-size flat laminated type battery is manufactured, a negative electrode 5, a separator 1, and a positive electrode 4 are generally sequentially transferred by use of a stacking hand and stacked at high speed. However, since the separator is made from a relatively soft material, if a part of the separator curls at the time of being transferred as shown in FIG. 2(b), the separator having the turned-up part is laminated in the laminated body. The turned-up part is then pressed, and the separator is thus stacked with the curled and turned-up part folded in the laminated body. This causes a short circuit, which significantly decreases yield rate and thereby increases cost.

Figure 3:
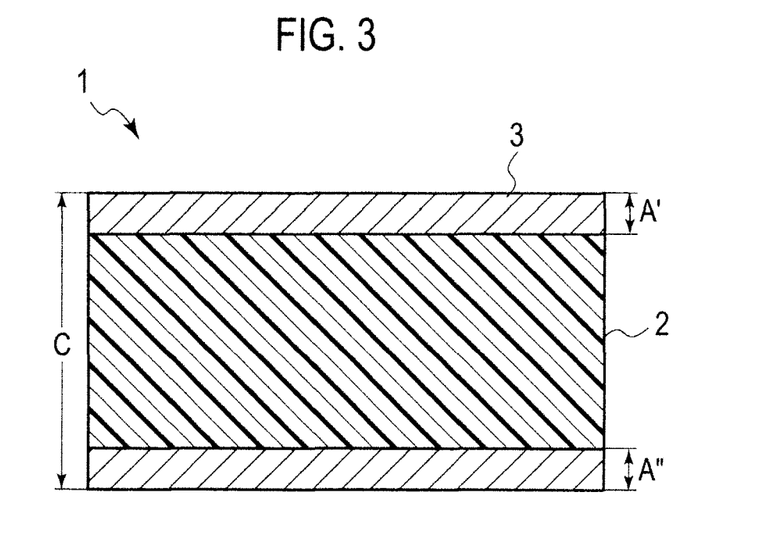
FIG. 3 is a schematic cross-sectional view showing the separator having heat resistant insulation layers according to the embodiment of the present invention.

In view of this, as shown in FIG. 3, the separator 1 having heat resistant insulation layers according to the present embodiment has a structure in which heat resistant insulation layers 3 are provided on both surfaces of the resin porous substrate 2.

Here, the reason why the separator causes a curled part may be because thermal stress remains when the heat resistant insulation layers are applied to the resin porous substrate and these are dried by heat such as warm air. In particular, the resin porous substrate is stretched out by heat drying since resin contained in the resin porous substrate has a large coefficient of linear expansion at the time of heating. On the other hand, since the heat resistant insulation layers are made from heat resistant particles having a melting point or a thermal softening point of 150° C. or higher, the heat resistant insulation layers have a substantially small coefficient of linear expansion in the temperature range of heat drying and thus hardly expand. Therefore, when the heat drying after the application of the heat resistant insulation layers to the resin porous substrate is finished and these are cooled to room temperature, the resin porous substrate greatly contracts, but the heat resistant insulation layers hardly contract. As a result, since a difference in contraction rate is caused between the resin porous substrate and the heat resistant insulation layers, the resin porous substrate tries to contract, but the heat resistant insulation layers resist the contraction. Accordingly, a curl is caused in a manner such that the resin porous substrate is bent inward.

Thus, according to the present embodiment, the heat resistant insulation layers 3 are applied to both surfaces of the resin porous substrate 2 in a manner such that thicknesses A', A" of the heat resistant insulation layers 3 are equalized as much as possible. This improves the balance of the contraction stress of the heat resistant insulation layers 3 in the vertical direction of the resin porous substrate and thereby prevents a curl. In addition, the thicknesses A', A" of the heat resistant insulation layers are adjusted so as to have a specific relationship with the entire thickness C of the separator. Accordingly, the balance between the internal stress of the resin porous substrate 2 and the contraction stress of the heat resistant insulation layers 3 is improved so as to sufficiently prevent a curl. Further, the parameter X represented by the mathematical formula (1) is set to greater than or equal to 0.15. This prevents occurrence of a large curl so as to solve the problem of a curl folded and laminated during the stacking operation.

The parameter X represented by the mathematical formula (1) is an index indicating the difference in contraction stress of the heat resistant insulation layers formed on both surfaces of the resin porous substrate as caused by drying. As the value of X becomes smaller, the difference in contraction stress of the heat resistant insulation layers is revealed more clearly. When the difference in contraction stress in the heat resistant insulation layers on both surfaces of the resin porous substrate is large with respect to the internal stress of the resin porous substrate, a curl tends to be caused. For example, as the thicknesses A', A" of the heat resistant insulation layers relative to the entire thickness C of the separator decrease, the parameter X decreases. In addition, the value of X decreases when the difference in thickness of the heat resistant insulation layers on both surfaces of the resin porous substrate is large because of, for example, a large difference in weight of the heat resistant insulation layers on both surfaces of the resin porous substrate. The parameter X is set to greater than or equal to 0.15, preferably greater than or equal to 0.20. If the value of X is below 0.15, the likelihood of a curl cannot be ignored and as a result, yield rate significantly decreases when large-size flat laminated type batteries are manufactured. Note that "weight" in this case represents a weight (g/m²) of the heat resistant insulation layers per unit area of the resin porous substrate.

The upper limit of the parameter X represented by the mathematical formula (1) is not particularly limited as long as a curl of the separator is prevented. For example, the upper limit may be 0.1.

In the separator according to the present embodiment, a parameter Y represented by the following mathematical formula (2) is preferably in the range from 0.3 to 0.7.

[Math 3]

$$Y = \frac{X}{(D/100)} \quad (2)$$

In the formula, X represents the same value as described above, and D represents a porosity of the respective heat resistant insulation layers 3.

As described above, in the separator according to the present embodiment, as the parameter X represented by the mathematical formula (1) becomes larger, a curl is not easily caused at an edge portion of the separator. However, when the thicknesses (A', A") of the heat resistant insulation layers increase, the value of X increases, but at the same time, ion permeability decreases and rate property decreases. The inventors investigated conditions for keeping a high rate property while preventing a curl and as a result, the inventors found out that the porosity (D in the mathematical formula (2)) of the heat resistant insulation layers was a factor in determining rate property. Namely, in order to prevent a curl and also ensure a high rate property, it is important that the two heat resistant insulation layers evenly press both surfaces of the resin porous substrate with appropriate pressure. If the pressure is too small or unbalanced, a curl tends to be caused. If the pressure is too strong, ion permeability decreases, which may cause a decrease of the rate property of the battery.

The parameter Y represented by the mathematical formula (2) is an index indicating the strength and uniformity with which the two heat resistant insulation layers press both surfaces of the resin porous substrate. For example, the value of Y decreases when the pressure applied to both surfaces of the resin porous substrate is unbalanced because of, for example, a large difference in weight of the heat resistant insulation layers on both surfaces of the resin porous substrate. In addition, the value of Y also decreases when the pressure from the heat resistant insulation layers is small because the heat resistant insulation layers are thin or the porosity is large. Further, the value of Y decreases as the entire thickness C of the separator increases. On the other hand, the value of Y increases when the pressure from the heat resistant insulation layers is large because the heat resistant insulation layers are thick or the porosity is large. In the separator according to the present embodiment, the parameter Y is preferably in the range from 0.3 to 0.7, more preferably in the range from 0.35 to 0.65. When the value of Y is greater than or equal to 0.3, a curl is not easily caused. If the value of Y is less than or equal to 0.7, a high rate property can be ensured.

In the mathematical formulae (1) and (2), values measured with a micrometer may be used as the thicknesses A', A" of the heat resistant insulation layers and the entire thickness C of the separator. The porosity D (%) of the heat resistant insulation layers may be obtained by the following mathematical formula (3) using a mass $W_i$ (g/cm$^2$) per unit area of each component "i" contained in the heat resistant insulation layers, a density $d_i$ (g/cm$^3$) of each component "i", and a thickness "t" (cm) of the respective heat resistant insulation layers. Note that, when the heat resistant insulation layers on both surfaces of the resin porous substrate have different porosities, the average value of the porosities is defined as the porosity D (%) thereof.

[Math 4]

$$D=[1-(\Sigma W_i/d_i)\times(1/t)]\times 100 \quad (3)$$

The heat resistant insulation layers 3 are provided on both surfaces of the resin porous substrate 2 in the stacking direction, namely, in the stacking direction of the positive electrode, the negative electrode and the electrolyte layer 17. As shown in FIG. 3, the heat resistant insulation layers 3 are preferably stacked directly on both surfaces of the resin porous substrate 2 in a manner as to be opposed to each other. Further, the heat resistant insulation layers 3 are preferably formed on both entire surfaces of the resin porous substrate 2. As shown in FIG. 3, each of the heat resistant insulation layers 3 may have a single-layer structure, or may have a multi-layer structure. When each of the heat resistant insulation layers 3 includes several layers, the layers may be made from different materials.

Hereinafter, the separator according to the present embodiment is explained in more detail.

(Resin Porous Substrate)

Examples of the resin porous substrate 2 include a porous sheet and woven fabric or nonwoven fabric containing organic resin that absorbs and holds an electrolyte. Preferable examples of the organic resin contained in the resin porous substrate include polyolefin such as polyethylene (PE) and polypropylene (PP); polyimide or aramid; and polyester such as polyethylene terephthalate (PET). The average value of fine pore diameters (an average fine pore diameter) formed in the resin porous substrate is preferably in the range from 10 nm to 1 µm. The fine pore diameters may be obtained, for example, by a nitrogen gas adsorption method. The thickness of the resin porous substrate is preferably in the range from 1 µm to 200 µm. The porosity of the resin porous substrate is preferably in the range from 20% to 90%.

The resin porous substrate is explained in more detail below. The porous sheet used as the resin porous substrate is a microporous film containing a fine porous polymer. Examples of such a polymer include polyolefin such as polyethylene (PE) and polypropylene (PP); a laminated body having a three-layer structure of PP/PE/PP; and polyimide or aramid. Particularly, polyolefin-based microporous film is preferably used because it is chemically stable with respect to an organic solvent so as to reduce reactivity with an electrolysis solution to a lower level.

The thickness of the porous sheet cannot be simply defined because it depends on the intended use. However, the thickness in a single-layer or multi-layer structure is preferably in the range from 4 µm to 60 µm in the case of being used in a secondary battery for driving a motor of a vehicle. The microporous diameters in the porous sheet are generally approximately 10 nm, and preferably smaller than or equal to 1 µm. The porosity of the porous sheet is preferably in the range from 20% to 80%.

Examples of the woven fabric or nonwoven fabric used for the resin porous substrate include polyester such as polyethylene terephthalate (PET); polyolefin such as PE and PP; and polyimide or aramid. The bulk density of the woven fabric or nonwoven fabric is not particularly limited as long as it can ensure sufficient battery performance from the electrolysis solution contained therein. The porosity of the woven fabric or nonwoven fabric is preferably in the range from 50% to 90%. The thickness of the woven fabric or nonwoven fabric is preferably in the range from 5 µm to 200 µm, particularly preferably in the range from 5 µm to 100 µm. When the thickness is greater than or equal to 5 µm, the retention of the electrolyte is high. When the thickness is less than or equal to 100 µm, the resistance is not easily increased excessively.

The method for preparing the resin porous substrate is not particularly limited. When the resin porous substrate is a polyolefin-based microporous film, the resin porous substrate may be prepared, for example, in a manner such that polyolefin is dissolved in a solvent, the dissolved material is extruded in a sheet-like shape, the solvent is removed therefrom, and the material thus obtained is subjected to uniaxial or biaxial drawing. Examples of the solvent include paraffin, liquid paraffin, paraffin oil, tetralin, ethylene glycol, glycerin, and decalin.

(Heat Resistant Insulation Layers (Heat Resistant Insulation Porous Layers))

In the present embodiment, the heat resistant particles included in the heat resistant insulation layers are made from a material having high heat resistance and a melting point or a thermal softening point of 150° C. or higher, preferably 240° C. or higher. Such a material having high heat resistance can effectively prevent the separator from contracting even when the temperature inside the battery reaches approximately 200° C. Accordingly, induction of a short circuit between the electrodes can be prevented so as to obtain a battery that hardly causes a decrease in performance due to an increase in temperature. Note that, in the present specification, the "thermal softening point" represents a temperature at which a heated substance starts to be softened and deformed, and is called Vicat softening temperature. The upper limit of the melting point or the thermal softening point of the heat resistant particles is not particularly limited; however, it may be, for example, 1500° C. or lower.

The heat resistant particles preferably have electrical insulation, are stable with respect to the solvent or the electrolysis solution used when preparing the heat resistant insulation layers, and are electrochemically stable so as not to easily be subjected to an oxidation-reduction reaction within the operation voltage range of the battery. The heat resistant particles may be either organic particles or inorganic particles, but are preferably inorganic particles in view of a safety aspect. The heat resistant particles are preferably fine particles in view of dispersibility. The fine particles used have an average secondary particle diameter (a median diameter, D50), for example, in the range from 100 nm to 4 μm, preferably in the range from 300 nm to 3 μm, more preferably in the range from 500 nm to 3 μm. The average secondary particle diameter (the median diameter) may be obtained by a dynamic light scattering method. The shape of the heat resistant particles is not particularly limited and may be a substantially spherical shape or may be a plate-like, a rod-like, or a needle-like shape.

The inorganic particles (inorganic powder) having a melting point or a thermal softening point of 150° C. or higher are not particularly limited. Examples of the inorganic particles include an inorganic oxide such as iron oxide (FeO), $SiO_2$, $Al_2O_3$, aluminosilicate, $TiO_2$, $BaTiO_2$, and $ZrO_2$; an inorganic nitride such as aluminum nitride and silicon nitride; a hardly-soluble ionic crystal such as calcium fluoride, barium fluoride, and barium sulfate; a covalent crystal such as silicon and diamond; and clay such as montmorillonite. The inorganic oxide may be a substance derived from a mineral source such as boehmite, zeolite, apatite, kaolin, mullite, spinel, olivine, and mica, or an artificial substance thereof. The inorganic particles may be particles having electrical insulation obtained in a manner such that the surface of an electrically conductive material is covered with a material having electrical insulation, such as the inorganic oxides described above. Examples of the electrically conductive material include metal; an electrically conductive oxide such as $SnO_2$ and tin-indium oxide (ITO); and a carbonaceous material such as carbon black and graphite. Among these, the inorganic oxide particles are preferable since such particles can easily be applied to the resin porous substrate as water-dispersible slurry so as to prepare the separator by a simple process. Particularly, alumina ($Al_2O_3$), silica ($SiO_2$) and aluminosilicate are preferably used as the inorganic oxide.

Examples of the organic particles (organic powder) having a melting point or a thermal softening point of 150° C. or higher include several types of cross-linked polymer particles such as cross-linked polymethyl methacrylate, cross-linked polystyrene, cross-linked polydivinylbenzene, a cross-linked styrene divinylbenzene copolymer, polyimide, melamine resin, phenol resin, and a benzoguanamine formaldehyde condensation product. Other examples of the organic particles include heat-resistant polymer particles such as polysulfone, polyacrylonitrile, polyaramid, polyacetal, and thermoplastic polyimide. The organic resin contained in these organic particles may be a mixture, a modified product, a derivative, a copolymer (a random copolymer, an alternating copolymer, a block copolymer, a graft copolymer), or a cross-linked product (in the case of the heat-resistant polymer fine particles) of the above-exemplified materials. Among these, particles of polymethyl methacrylate and polyaramid are preferably used as the organic particles in view of industrial productivity and electrochemical stability. Due to such organic resin particles, the separator mainly containing resin can be manufactured, which contributes to a reduction in weight of the battery itself.

The heat resistant particles described above may be used alone or in combination of two or more.

The thickness of the heat resistant insulation layers using the heat resistant particles described above is not particularly limited and determined as appropriate according to the type and the intended use of the battery. However, for example, the total thickness of the heat resistant insulation layers formed on both surfaces of the resin porous substrate is preferably in the range from 5 μm to 200 μm. In the case of a secondary battery for driving a motor for use in, for example, an electric vehicle or a hybrid electric vehicle, the total thickness of the heat resistant insulation layers formed on both surfaces of the resin porous substrate is in the range from 5 μm to 200 μm, preferably in the range from 5 μm to 20 μm, more preferably in the range from 6 μm to 10 μm. When the total thickness is within these ranges, high output performance can be ensured while mechanical strength in thickness direction (in the stacking direction) is increased.

The ratio of the thicknesses A'/A" of the heat resistant insulation layers formed on both surfaces of the resin porous substrate may be set to fulfill the mathematical formula (1), but is preferably less than or equal to 1.2, more preferably less than or equal to 1.1. Namely, the ratio of the thicknesses A'/A" of the heat resistant insulation layers is preferably in the range from 1.0 to 1.2, more preferably in the range from 1.0 to 1.1. The thicknesses of the heat resistant insulation layers formed on both surfaces of the resin porous substrate are preferably the same to the extent possible. Accordingly, the two heat resistant insulation layers can evenly press both surfaces of the resin porous substrate so as to prevent a curl of the separator.

The porosity of the heat resistant insulation layers using the heat resistant particles described above is not particularly limited, but is preferably greater than or equal to 40%, more preferably greater than or equal to 50% in view of ion conductivity. When the porosity is greater than or equal to 40%, the retention of the electrolyte (the electrolysis solution or electrolyte gel) increases so as to obtain a battery with high output performance. In addition, the porosity of the heat resistant insulation layers is preferably less than or equal to 70%, more preferably less than or equal to 60%. When the porosity of the heat resistant insulation layers is less than or equal to 70%, sufficient mechanical strength can be ensured, and the effect of preventing a short circuit due to foreign bodies increases.

The content of the heat resistant particles in the heat resistant insulation layers is preferably in the range from 90% by mass to 100% by mass, more preferably in the range from 95% by mass to 100% by mass. Accordingly, the two heat resistant insulation layers can evenly press both surfaces of the resin porous substrate.

(Method for Manufacturing Separator)

The method for manufacturing the separator according to the present embodiment is not particularly limited. For example, the separator may be manufactured in a manner such that slurry of a composition for the heat resistant insulation layers containing heat resistant particles having a melting point or a thermal softening point of 150° C. or higher, is applied to both surfaces of the resin porous substrate, followed by drying.

The composition for the heat resistant insulation layers is obtained in a manner such that the heat resistant particles are dispersed in a solvent, to which an organic binder may be added as necessary. Examples of the organic binder added to increase shape stability of the heat resistant insulation layers include carboxymethyl cellulose, hydroxyethyl cellulose, polyvinyl alcohol, polyvinyl butyral, and polyvinyl pyrrolidone. When the composition contains the organic binder, the usage amount of the organic binder is preferably less than or equal to 10% by mass, more preferably less than or equal to 5% by mass with respect to the total mass of the heat resistant particles and the organic binder. The solvent is not particularly limited as long as the heat resistant particles can evenly be dispersed therein. Examples of the solvent include water; aromatic hydrocarbon such as toluene; furan such as tetrahydrofuran; ketone such as ethyl methyl ketone, isobutyl methyl ketone, and acetone; N-methylpyrrolidone; dimethylacetamide; dimethylformamide; dimethylsulfoxide; and ethyl acetate. To these solvents, ethylene glycol, propylene glycol, or monomethyl acetate may be added as appropriate in order to control interfacial tension. Particularly, when the inorganic oxide particles are used as the heat resistant particles, water may be used as the solvent to prepare water-dispersible slurry so as to easily prepare the heat resistant insulation layers. The composition for the heat resistant insulation layers is preferably prepared in a manner as to have a solid content concentration in the range from 30% by mass to 60% by mass.

The weight of the composition for the heat resistant insulation layers applied to the resin porous substrate is not particularly limited, but is preferably in the range from 5 to 20 g/m$^2$, more preferably in the range from 9 to 13 g/m$^2$. Note that the "weight" in this case represents a weight (g/m$^2$) of the composition for the heat resistant insulation layers per unit area of the resin porous substrate. When the weight is within such a range, the heat resistant insulation layers having an appropriate porosity and thickness can be obtained. The method for applying the composition is not particularly limited, and examples thereof include a knife coater method, a gravure coater method, a screen printing method, a meyer bar method, a die coater method, a reverse roll coater method, an ink-jet method, a spray method, and a roll coater method.

The method for drying the composition for the heat resistant insulation layers after coating is not particularly limited; however, warm air drying may be employed. For example, the drying temperature is in the range from 30° C. to 80° C., and the drying time is in the range from 2 seconds to 50 hours.

The entire thickness of the separator thus obtained is not particularly limited; however, a range from 5 μm to 30 μm is applicable. In order to obtain a small-size battery, the thickness of the separator is preferably reduced as much as possible to the extent that the electrolyte layer can function sufficiently. Therefore, in order to reduce the thickness and contribute to improve output performance of the battery, the entire thickness of the separator according to the present embodiment is preferably in the range from 20 μm to 30 μm, more preferably in the range from 20 μm to 25 μm.

The electrolyte layer is not particularly limited as long as the separator according to the present embodiment is used therein. That is, the electrolyte layer includes the separator, and the electrolyte contained in the resin porous substrate and the heat resistant insulation layers of the separator. The electrolyte held in the electrolyte layer preferably contains lithium ions and has high lithium ion conductivity.

In particular, the electrolyte layer may use the separator containing an electrolysis solution having high ion conductivity. Alternatively, the electrolyte layer may be obtained in a manner such that a gel electrolyte or the like is applied to the separator by way of impregnation, coating or spray.

(a) Separator Containing Electrolysis Solution

With regard to the electrolysis solution capable of permeating the separator, the electrolyte may be at least one of LiClO$_4$, LiAsF$_6$, LiPF$_6$, LiBOB, LiCF$_3$SO$_3$, and Li(CF$_3$SO$_2$)$_2$N. The solvent for the electrolysis solution may be at least one ether selected from the group consisting of ethylene carbonate (EC), propylene carbonate, diethyl carbonate (DEC), dimethyl carbonate, ethyl methyl carbonate, 1,2-dimethoxyethane, 1,2-diethoxyethane, tetrahydrofuran, 1,3-dioxolan, and γ-butyrolactone. An electrolysis solution prepared in a manner such that the electrolyte is dissolved in the solvent and the concentration of the electrolyte is set in the range from 0.5 M to 2 M, is preferably used. However, the present invention is not limited to such an electrolysis solution.

The explanation of the separator here is omitted since the separator according to the present invention described above is used.

The electrolysis solution may be held in the separator by impregnation, coating or the like up to full capacity, or may be held in the separator beyond the holding capacity. For example, in the case of a bipolar battery, since leakage of the electrolysis solution from the electrolyte layer can be prevented by pouring resin in an electrolyte sealing portion, the impregnation can be possible beyond the holding capacity of the separator to the extent that the electrolyte layer can hold the electrolysis solution. Similarly, in the case of a non-bipolar battery, since the battery element is sealed in the battery exterior member and thus leakage of the electrolysis solution from the battery exterior member can be prevented, the impregnation can be possible beyond the holding capacity of the separator to the extent that the battery exterior member can hold the electrolysis solution. The separator may be impregnated with the electrolysis solution by a conventionally-known method, for example, in a manner such that the electrolysis solution is poured by a vacuum filling method, followed by sealing completely.

(b) Gel Electrolyte Layer

The gel electrolyte layer according to the present invention is obtained in a manner such that the separator holds the gel electrolyte by impregnation or coating.

The gel electrolyte has a constitution in which the liquid electrolyte (the electrolysis solution) is poured in a matrix polymer including an ion conductive polymer. Examples of the ion conductive polymer used for the matrix polymer include polyethylene oxide (PEO), polypropylene oxide (PPO), and a copolymer thereof. In such a polyalkylene oxide polymer, electrolyte salt such as lithium salt can be dissolved sufficiently.

The content ratio of the liquid electrolyte (the electrolysis solution) in the gel electrolyte is not particularly limited, but is preferably in the range from several % by mass to 98% by mass in view of ion conductivity and the like. According to the present embodiment, the gel electrolyte exhibits better effects particularly when a large amount of the electrolysis solution is contained therein, namely, when the content ratio is greater than or equal to 70% by mass.

The matrix polymer of the gel electrolyte can ensure high mechanical strength when a cross-linked structure is formed. The cross-linked structure may be formed in a manner such that a polymerizable polymer used for polymer electrolyte formation is subjected to polymerization by use of an appropriate polymerization initiator. Examples of the polymerization include thermal polymerization, ultraviolet polymerization, radiation polymerization, and electron beam polymerization. Examples of the polymerizable polymer used include PEO and PPO.

The thickness of the electrolyte layer is not particularly limited but is basically substantially the same as or slightly greater than the thickness of the separator according to the present embodiment. The thickness of the electrolyte layer in the range from 5 µm to 30 µm is applicable.

According to the present invention, conventionally-known various additives may be contained in the electrolyte of the electrolyte layer to the extent of not impairing the effects of the present invention.

[Current Collecting Plates and Leads]

Current collecting plates may be used to extract a current outside of the battery. Such current collecting plates are electrically connected to the current collectors and leads and exposed to the outside of a laminated sheet that is the battery exterior member.

The material constituting the current collecting plates is not particularly limited and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof. The material is more preferably aluminum or copper in view of lightness, corrosion resistance and high electric conductivity. The positive electrode current collecting plates and the negative electrode current collecting plates may be made from the same material or may be made from different materials.

A positive terminal lead and a negative terminal lead are used as necessary. The positive terminal lead and the negative terminal lead may be terminal leads conventionally used for lithium ion secondary batteries. Each part exposed to the outside of the battery exterior member 29 is preferably covered with, for example, a heat shrinkable tube having a heat resistant insulating property. This reduces the chances of any negative influence on surrounding products (such as components in a vehicle, in particular, electronic devices) caused by a short circuit because of contact with peripheral devices or wires.

[Battery Exterior Member]

As the battery exterior member 29, a known metal can casing may be used. Alternatively, a sac-like casing capable of covering the power generation element and using a laminated film containing aluminum may be used. The laminated film may be a film having a three-layer structure in which PP, aluminum, and nylon are laminated in this order but is not limited to this. The laminated film is preferable in view of high output power and cooling performance and suitability for use in a battery for large devices such as EV and HEV.

The lithium ion secondary battery described above can be manufactured by a conventionally-known method.

[Appearance Configuration of Lithium Ion Secondary Battery]

Figure 4:
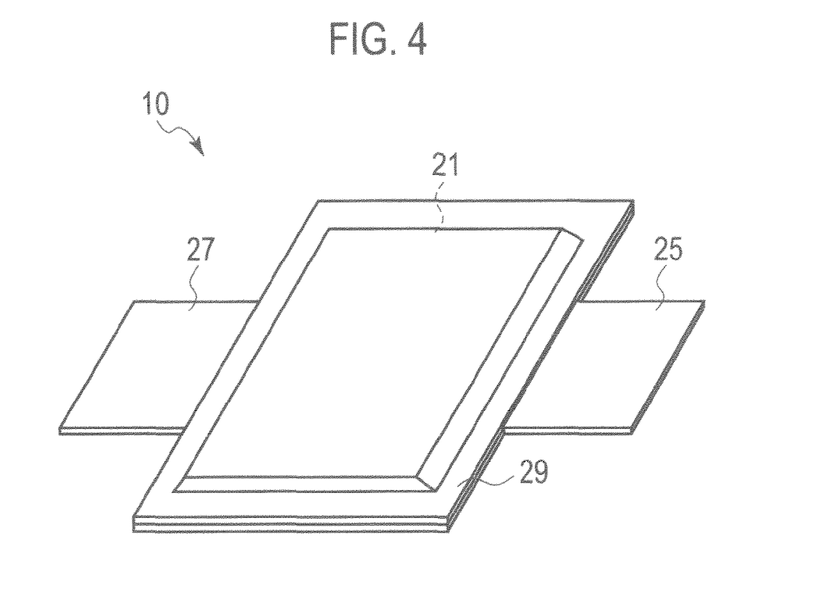
FIG. 4 is a perspective view showing a typical appearance of the flat laminated type non-bipolar lithium ion secondary battery according to the embodiment of the present invention.

FIG. 4 shows a perspective view showing an appearance of the flat laminated type lithium ion secondary battery.

As shown in FIG. 4, the laminated battery 10 has a flat rectangular shape, and the positive electrode current collecting plate 25 and the negative electrode current collecting plate 27 for extracting a current protrude out from both sides of the laminated battery 10. The power generation element 21 is enclosed by the battery exterior member 29 of the laminated battery 10 and the periphery thereof is thermally fused. The power generation element 21 is tightly sealed while the positive electrode current collecting plate 25 and the negative electrode current collecting plate 27 protrude to the outside. The power generation element 21 is obtained in a manner such that plural single cell layers (single cells) 19, each being formed of the positive electrode (positive electrode active material layer 13), the electrolyte layer 17, and the negative electrode (negative electrode active material layer 15), are stacked on top of each other.

The state of protruding the positive electrode current collecting plate 25 and the negative electrode current collecting plate 27 from the battery exterior member 29 shown in FIG. 4 is not particularly limited. The positive electrode current collecting plate 25 and the negative electrode current collecting plate 27 may protrude from the same side. Alternatively, each of plural positive electrode current collecting plates 25 and negative electrode current collecting plates 27 may protrude separately from each side. Namely, the state of protruding the positive electrode current collecting plate 25 and the negative electrode current collecting plate 27 from the battery exterior member 29 is not limited to that shown in FIG. 4.

The lithium ion secondary battery was exemplified as an electric device in the present embodiment. However, the present embodiment is not limited to this and is applicable to secondary batteries of other types and, further, to primary batteries. In addition, the present embodiment is applicable not only to batteries but also to capacitors.

EXAMPLES

The present invention will be explained in more details with reference to examples; however, the present invention is not limited to these examples.

Example 1

An aqueous dispersion of aluminosilicate fine particles as a composition for heat resistant insulation layers was applied by a blade coater to both surfaces of a polyethylene (PE) fine porous film as a resin porous substrate. The polyethylene fine porous film had a film thickness of 18.9 µm and a porosity of 42%. The aluminosilicate fine particles had an average secondary particle diameter of 1 µm and a melting point of 1000° C. or higher. The aqueous dispersion of the aluminosilicate fine particles had a solid content concentration of 40% by mass. The aqueous dispersion was then dried by warm air to form heat resistant insulation layers, thereby preparing a separator having the heat resistant insulation layers. The separator having the heat resistant insulation layers had a width of 200 mm and was formed into a roll shape.

Although the heat resistant insulation layers were applied to each surface so as to have a thickness of 2.8 µm or greater, the actual resulting heat resistant insulation layer on one side had a greater thickness (3.1 µm) than the actual heat resistant insulation layer on the other side (2.5 µm). The entire thickness of the separator having the heat resistant insulation layers was 24.5 µm, and the porosity of the respective heat resistant insulation layers was 47%.

Examples 2 to 12

Comparative Examples 1 to 4

A separator having a resin porous substrate and heat resistant insulation layers was prepared for the respective examples as shown in Table 1 in a manner similar to Example 1.

In each of Examples 2, 3, 6, 11, and Comparative Example 2, however, a polypropylene (PP) fine porous film (a porosity of 55%) was used as the resin porous substrate instead of the polyethylene fine porous film.

In each of Examples 4, 5, 7, 9, 10, and Comparative Example 3, a polyethylene (PE) fine porous film (a porosity of 52%) was used as the resin porous substrate instead of the polyethylene fine porous film (a porosity of 42%).

In Example 8, non-woven fabric made from polyethylene terephthalate (PET) was used as the resin porous substrate instead of the polyethylene fine porous film. The non-woven fabric made from polyethylene terephthalate had a film thickness of 11.1 μm and a porosity of 48%.

In each of Comparative Examples 1, 4, and 5, a polyethylene (PE) fine porous film (a porosity of 42%) was used as the resin porous substrate.

In each of Examples 2 to 7, 10, 11, Comparative Examples 2, and 3, alumina particles with high purity were used as the heat resistant particles instead of aluminosilicate in Example 1. The alumina particles with high purity had an average secondary particle diameter of 1.5 μm and a melting point of 1000° C. or higher.

In Example 8, an ethyl methyl ketone dispersion of colloidal silica particles was used instead of the aluminosilicate aqueous dispersion in Example 1. The colloidal silica particles had an average secondary particle diameter of 0.4 μm and a melting point of 1000° C. or higher. The ethyl methyl ketone dispersion had a solid content concentration of 30% by mass.

In Example 9, particles of cross-linked polymethyl acrylate were used instead of the aluminosilicate aqueous dispersion in Example 1. The particles of cross-linked polymethyl acrylate had an average secondary particle diameter of 1 μm and a thermal softening point of approximately 160° C.

In Example 12, an NMP dispersion of aromatic polyamide (aramid) resin was used for the composition for the heat resistant insulation layers, to which ethylene glycol was added so as to obtain porous layers.

Comparative Example 5

Similar operations to those of Example 1 were repeated except that the heat resistant insulation layer was applied to one surface of the resin porous substrate, thereby preparing a separator.

Table 1 summarizes the thicknesses A', A" (μm) of the heat resistant insulation layers, the entire thickness C (μm), and the porosity D (%) of the heat resistant insulation layers in the separator obtained in each of Examples 1 to 12 and Comparative Examples 1 to 5.

[Curl Height]

Figure 5:
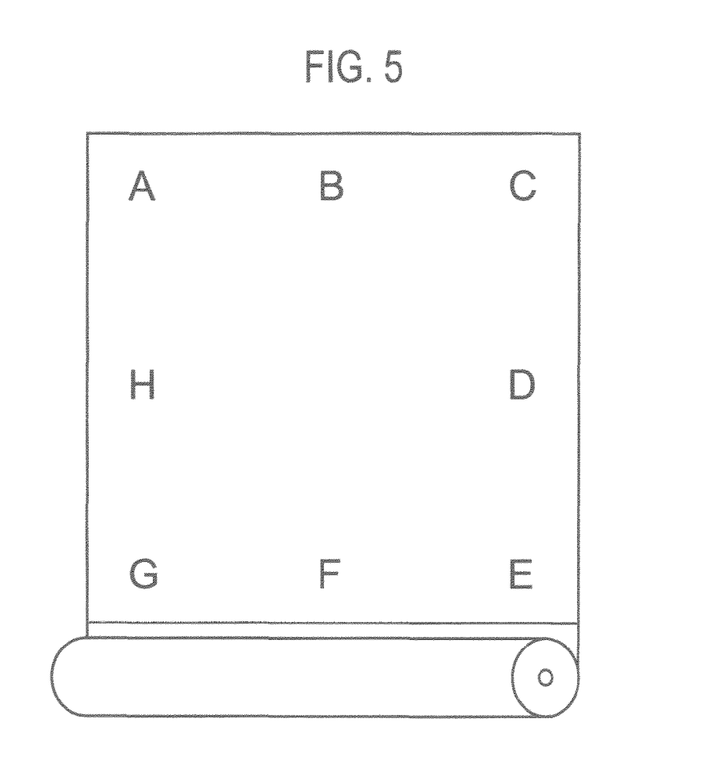
FIG. 5 is a schematic view for explaining a method for measuring a curl height in Examples.

The curl height of the separator prepared in each of Examples and Comparative Examples was measured as follows. First, as shown in FIG. 5, a substantially rectangular piece was cut out from the roll of the separator and placed on a horizontal surface, and then static electricity was removed by sweeping the piece twice with an anti-static brush. Then, the height raised from the horizontal surface after 60 seconds was measured in each of eight sections A to H shown in FIG. 5 so as to define the maximum value as the curl height (mm). In the case of being rolled up, the rolled-up part was opened and stretched upward, and the height was thus measured.

[Battery Evaluation]

An aluminum foil and a copper foil were prepared as a positive electrode current collector and a negative electrode current collector, respectively. A lithium cobalt nickel manganese oxide ($LiNi_{0.33}Cu_{0.33}Mn_{0.33}O_2$) was used as a positive electrode active material so as to prepare positive electrode active material slurry. Artificial graphite was used as a negative electrode active material so as to prepare negative electrode active material slurry. The positive electrode active material slurry and the negative electrode active material slurry were applied to the aluminum foil as the positive electrode current collector and the copper foil as the negative electrode current collector respectively. These were then subjected to drying and roll pressing so as to prepare a positive electrode and a negative electrode. The separator prepared in each of Examples and Comparative Examples was interposed between the positive electrode and the negative electrode thus obtained, a non-aqueous electrolysis solution was poured therein, and these were sealed in a laminated sheet so as to prepare a battery for evaluation. The non-aqueous electrolysis solution used was prepared in a manner such that $LiPF_6$ was dissolved, at a concentration of 1.0 ml/L, into a mixed solvent of ethylene carbonate:ethyl methyl carbonate=1:2 (volume ratio).

After preparing each battery, the battery was subjected to initial charge and discharge so as to measure the battery capacity. The initial discharge capacity was 20 mAh. With regard to the battery, a discharge capacity at 4.0 mA and a discharge capacity at 50 mA were measured so as to define the ratio (discharge capacity at 50 mA/discharge capacity at 4.0 mA) as a rate property (a rate ratio) (%).

Figure 6:
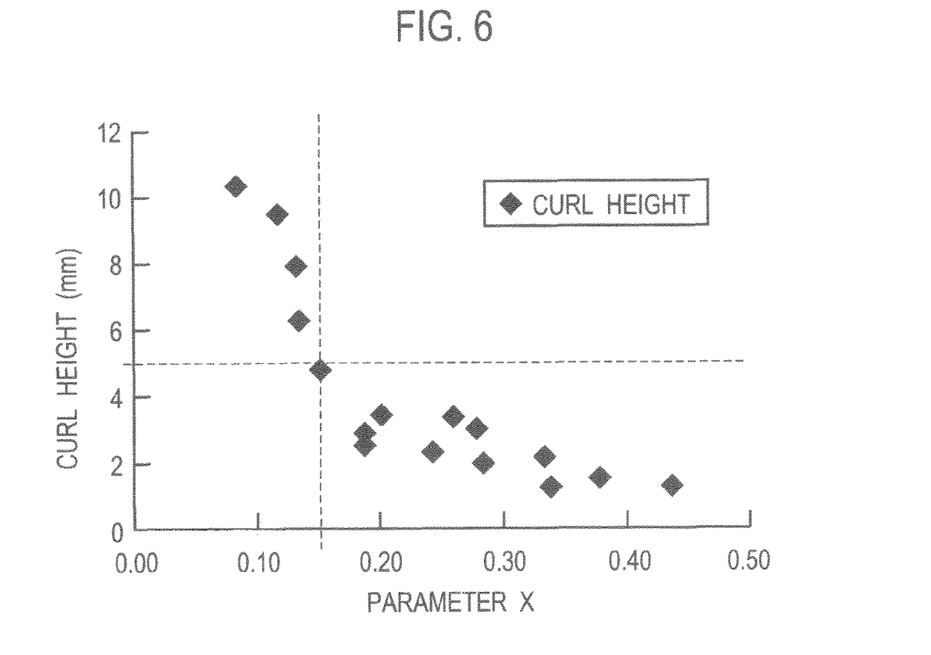
FIG. 6 is a graph showing a relationship between a parameter X and a curl height of a separator prepared in each of Examples and Comparative Examples.
Figure 7:
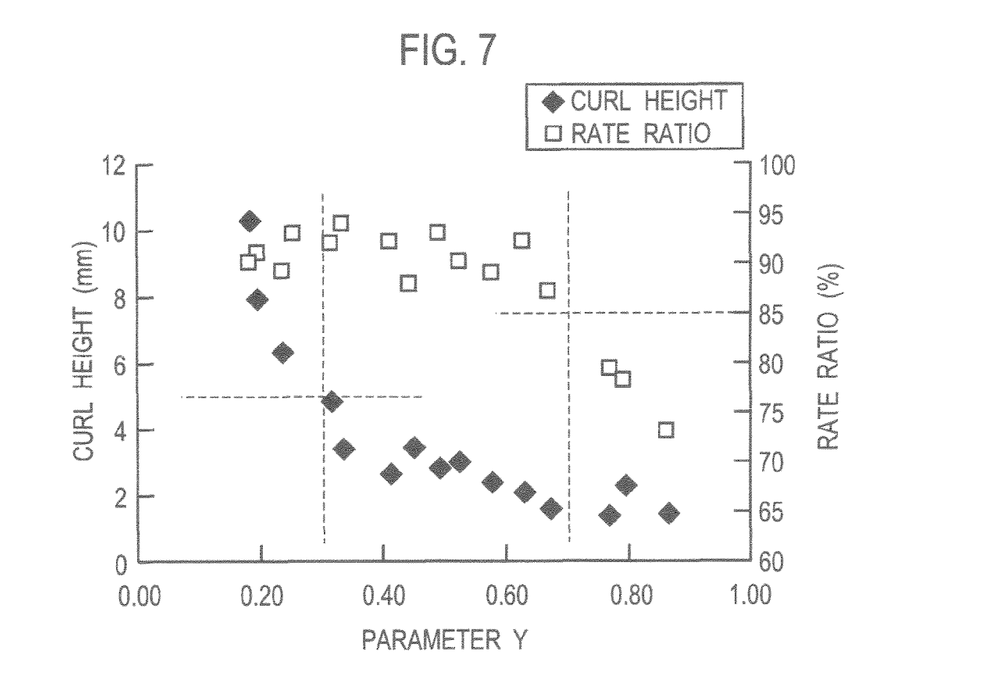
FIG. 7 is a graph showing a relationship among a parameter Y, a curl height, and a rate property of the separator prepared in each of Examples and Comparative Examples.

Table 1 shows the result of the rate property in each of Examples and Comparative Examples. FIG. 6 shows a relationship between the parameter X and the curl height, and FIG. 7 shows a relationship among the parameter Y, the curl height, and the rate property.

TABLE 1

| | Resin porous substrate | Heat resistant particle | A' (μm) | A" (μm) | A' + A" (μm) | A'/A" | C (μm) | D (%) | X | Y | Curl height (mm) | Rate ratio (%) |
|---|---|---|---|---|---|---|---|---|---|---|---|---|
| Example 1 | PE | Aluminosilicate | 3.1 | 2.5 | 5.6 | 1.240 | 24.5 | 47 | 0.15 | 0.32 | 4.8 | 92 |
| Example 2 | PP | Alumina | 3.5 | 3.3 | 6.8 | 1.061 | 25.0 | 42 | 0.24 | 0.58 | 2.3 | 89 |
| Example 3 | PP | Alumina | 4.9 | 3.9 | 8.8 | 1.256 | 29.8 | 38 | 0.19 | 0.49 | 2.8 | 93 |
| Example 4 | PE | Alumina | 5.9 | 4.5 | 10.4 | 1.311 | 23.5 | 77 | 0.26 | 0.33 | 3.4 | 94 |
| Example 5 | PE | Alumina | 4.5 | 4.1 | 8.6 | 1.098 | 25.7 | 53 | 0.28 | 0.52 | 3.0 | 90 |
| Example 6 | PP | Alumina | 7.8 | 6.8 | 14.6 | 1.147 | 29.5 | 56 | 0.38 | 0.67 | 1.5 | 87 |
| Example 7 | PE | Alumina | 3.2 | 3.0 | 6.2 | 1.067 | 27.2 | 45 | 0.20 | 0.45 | 3.4 | 88 |
| Example 8 | PET nonwoven fabric | Silica | 1.8 | 1.6 | 3.4 | 1.125 | 14.5 | 45 | 0.19 | 0.41 | 2.6 | 92 |
| Example 9 | PE | PMMA | 2.8 | 2.7 | 5.5 | 1.037 | 18.1 | 45 | 0.28 | 0.63 | 2.0 | 92 |
| Example 10 | PE | Alumina | 9.4 | 8.3 | 17.7 | 1.133 | 31.5 | 51 | 0.44 | 0.86 | 1.3 | 73 |
| Example 11 | PP | Alumina | 8.9 | 7.4 | 16.3 | 1.203 | 33.4 | 44 | 0.34 | 0.77 | 1.3 | 79 |

TABLE 1-continued

| | Resin porous substrate | Heat resistant particle | A' (μm) | A" (μm) | A' + A" (μm) | A'/A" | C (μm) | D (%) | X | Y | Curl height (mm) | Rate ratio (%) |
|---|---|---|---|---|---|---|---|---|---|---|---|---|
| Example 12 | PE | Aramid | 4.2 | 3.9 | 8.1 | 1.077 | 22.1 | 42 | 0.33 | 0.79 | 2.2 | 78 |
| Comparative Example 1 | PE | aluminosilicate | 3.2 | 2.5 | 5.7 | 1.280 | 26.4 | 67 | 0.13 | 0.20 | 7.9 | 91 |
| Comparative Example 2 | PP | Alumina | 1.9 | 1.6 | 3.5 | 1.188 | 30.3 | 44 | 0.08 | 0.19 | 10.3 | 90 |
| Comparative Example 3 | PE | Alumina | 2.3 | 2.1 | 4.4 | 1.095 | 27.8 | 56 | 0.13 | 0.24 | 6.3 | 89 |
| Comparative Example 4 | PE | aluminosilicate | 2.8 | 2.0 | 4.8 | 1.400 | 21.2 | 45 | 0.12 | 0.26 | 9.5 | 93 |
| Comparative Example 5 | PE | aluminosilicate | 5.8 | — | 5.8 | — | 21.2 | 45 | — | — | 26 | 91 |

The parameter X of each of the separators prepared in Examples 1 to 12 was greater than or equal to 0.15. The curl height of each of Examples 1 to 12 was less than or equal to 5 mm. Thus, there was no problem with the separator even when being stacked by using a continuous flat laminating machine. When using the continuous flat laminating machine, the process including the steps of cutting with a heated knife, transferring with a porous suction pad, and stacking with a four-point clamp, was repeated several tens of times. As a result, no curl was found at edge portions during stacking. Note that the process including the steps of cutting with the heated knife, transferring with the porous suction pad, and stacking with the four-point clamp, was carried out in approximately three seconds.

Some parts of the separators prepared in Comparative Examples 1 to 4 were curled during the transfer to the electrodes by using the continuous flat laminating machine. As a result, each separator was laminated in the laminated body with the curled part pressed, and the separator was thus unusable. In particular, in Comparative Example 5 in which only one side of the separator was processed, the separator was curled immediately after cutting. As a result, the transfer itself was not possible.

With regard to the rate property, the separators prepared in Examples 1 to 9 each showed the parameter Y in the range from 0.3 to 0.7 and ensured sufficient output performance exceeding 85%. In each of Examples 10 to 12 of which the parameter Y exceeded 0.7, the rate property was below 85%, and the performance was slightly insufficient as a product.

These results revealed that a curl could be prevented by adjusting the thicknesses of the heat resistant insulation layers with respect to the entire thickness of the separator and by controlling the balance between the thicknesses of the heat resistant insulation layers on both sides of the separator. In addition to the conditions described above, it was found that a battery having high output performance could be obtained by adjusting the thickness and the porosity of the respective heat resistant insulation layers.

The entire content of Japanese Patent Application No. P2011-138983 (filed on Jun. 22, 2011) is herein incorporated by reference.

Although the present invention has been described above by reference to the examples, the present invention is not limited to the descriptions thereof, and it will be apparent to those skilled in the art that various modifications and improvements can be made.

INDUSTRIAL APPLICABILITY

In the separator having heat resistant insulation layers according to the present invention, the balance of the contraction stress of the heat resistant insulation layers on both sides of the separator is improved by controlling the thickness of the respective heat resistant insulation layers on both sides and the entire thickness of the separator. In addition, the balance between the internal stress of the resin porous substrate and the contraction stress of the heat resistant insulation layers is improved. Accordingly, a curl is not easily caused during the lamination so that an electric device having high reliability can stably be manufactured.

REFERENCE SIGNS LIST

1 SEPARATOR HAVING HEAT RESISTANT INSULATION LAYERS (SEPARATOR)
2 RESIN POROUS SUBSTRATE
3 HEAT RESISTANT INSULATION LAYER
4 POSITIVE ELECTRODE
5 NEGATIVE ELECTRODE
10 LAMINATED BATTERY (LITHIUM ION SECONDARY BATTERY)
11 POSITIVE ELECTRODE CURRENT COLLECTOR
12 NEGATIVE ELECTRODE CURRENT COLLECTOR
13 POSITIVE ELECTRODE ACTIVE MATERIAL LAYER
15 NEGATIVE ELECTRODE ACTIVE MATERIAL LAYER
17 ELECTROLYTE LAYER
19 SINGLE CELL LAYER
21 POWER GENERATION ELEMENT
25 POSITIVE ELECTRODE CURRENT COLLECTING PLATE
27 NEGATIVE ELECTRODE CURRENT COLLECTING PLATE
29 BATTERY EXTERIOR MEMBER (LAMINATED FILM)

The invention claimed is:

1. A separator having heat resistant insulation layers for an electric device, the separator comprising:
a resin porous substrate; and
heat resistant insulation layers formed on both surfaces of the resin porous substrate and containing heat resistant particles having a melting point or a thermal softening point of 150° C. or higher, wherein a parameter X represented by the following mathematical formula 1 is greater than or equal to 0.15:

$$X = \frac{(A' + A'')}{C \times (A'/A'')^2} \quad \text{[Math 1]}$$

where A' and A" represent thicknesses (μm) of the respective heat resistant insulation layers formed on both surfaces of the resin porous substrate while fulfilling a condition of A'>A", and C represents an entire thickness (μm) of the separator having the heat resistant insulation layers, wherein C is greater than or equal to 24.5 μm, and wherein a parameter Y represented by the following mathematical formula 2 is in a range from 0.3 to 0.7:

$$Y = \frac{X}{(D/100)} \quad \text{[Math 2]}$$

where D represents a porosity (%) of the respective heat resistant insulation layers.

2. The separator having heat resistant insulation layers according to claim 1, wherein the parameter X is greater than or equal to 0.20.

3. The separator having heat resistant insulation layers according to claim 1, wherein the heat resistant particles are inorganic oxide particles.

4. The separator having heat resistant insulation layers according to claim 1, wherein the heat resistant particles are organic resin particles.

5. The separator having heat resistant insulation layers according to claim 1, wherein the porosity of the respective heat resistant insulation layers is in a range from 0.4 to 0.7.

6. The separator having heat resistant insulation layers according to claim 1, wherein a total thickness of the heat resistant insulation layers is in a range from 5 μm to 200 μm, and a ratio of the thicknesses (A'/A") of the heat resistant insulation layers is in a range from 1.037 to 1.2.

7. An electrolyte layer for an electric device, comprising:
the separator having the heat resistant insulation layers according to claim 1; and
an electrolyte contained in the resin porous substrate and the heat resistant insulation layers of the separator having the heat resistant insulation layers.

8. An electric device comprising the separator having the heat resistant insulation layers according to claim 1.

* * * * *